(12) United States Patent
Kao

(10) Patent No.: US 6,976,837 B2
(45) Date of Patent: Dec. 20, 2005

(54) CD MOLDING APPARATUS

(75) Inventor: Chih-Wen Kao, Taoyuan (TW)

(73) Assignee: Daxon Technology Inc., Taoyuan (TW)

( * ) Notice: Subject to any disclaimer, the term of this patent is extended or adjusted under 35 U.S.C. 154(b) by 227 days.

(21) Appl. No.: 10/734,402

(22) Filed: Dec. 12, 2003

(65) Prior Publication Data

US 2004/0126457 A1 Jul. 1, 2004

(30) Foreign Application Priority Data

Dec. 17, 2002 (TW) .............................. 91220495 U

(51) Int. Cl.$^7$ ............................................ B29D 11/00
(52) U.S. Cl. ...................... 425/556; 425/437; 425/810; 425/812
(58) Field of Search .............................. 425/437, 556, 425/810, 812; 264/1.33, 106

(56) References Cited

U.S. PATENT DOCUMENTS

| | | | |
|---|---|---|---|
| 5,804,229 A * | 9/1998 | Asai | 425/556 |
| 5,882,700 A * | 3/1999 | Asai | 425/556 |
| 5,997,788 A * | 12/1999 | Ebina | 264/155 |
| 6,302,674 B1 * | 10/2001 | Arakawa et al. | 425/192 R |

FOREIGN PATENT DOCUMENTS

JP    09-155934    *  6/1997

OTHER PUBLICATIONS

English abstract for JP 09-155934.*

* cited by examiner

Primary Examiner—Donald Heckenberg
(74) Attorney, Agent, or Firm—Quintero Law Office

(57) ABSTRACT

A compact disc (CD) molding apparatus. The CD molding apparatus comprises a movable mold, a fixed mold, a mold cavity, an outer ring, a gas passage, an outlet and an auxiliary gas channel. The movable mold is disposed adjacent to the fixed mold. The mold cavity is defined between the movable mold and the fixed mold. The outer ring surrounds the mold cavity, and the outlet is defined between the fixed mold and the outer ring. The gas passage is defined between the fixed mold and the outer ring and connects the mold cavity and the outlet. Particularly, the auxiliary gas channel is disposed in the fixed mold and connected to the gas passage to facilitate exhaust of high temperature gas from the mold cavity, wherein a material is injected into the mold cavity and the high temperature gas passes through the gas passage before exiting through the outlet.

9 Claims, 2 Drawing Sheets

CD MOLDING APPARATUS

BACKGROUND OF THE INVENTION

1. Field of the Invention

The present invention relates in general to a compact disc (CD) molding apparatus, and more particularly, to a CD molding apparatus with auxiliary gas channels.

2. Description of the Related Art

Compact Disc (CD) advantages of large storage volume, low cost and long-time storage integrity have led to wide application in storage of data such as digital images, music and photos. In the manufacturing process, tiny Polycarbonate (PC) pellets are melted to mold a transparent plastic substrate, subsequently plated with metal by vacuum evaporation or sputtering, forming a reflective layer. Digital data is thus read by laser light reflected via the reflective layer. The metallic reflective layer, while normally aluminum, can also be gold, silver or copper. The CD is finished coating the metallic reflective layer with a protective lacquer.

Referring to FIG. 1, a conventional CD mold apparatus has a fixed mold 1 and a movable mold 2. As shown in FIG. 1, a disc-shaped mold cavity 4 is defined between the fixed mold 1 and the movable mold 2 to mold a substrate, with a stamper 21 fixed on the movable mold 2, having a transfer surface 211 with pit patterns thereon to imprint digital information to the CD substrate. Particularly, the mold 2 is movable perpendicular to the transfer surface 211 such that the CD substrate can be stripped. High temperature gas, generated by melted Polycarbonate (PC) injection in the mold cavity 4 is exhausted through the gas passage 5.

As shown in FIG. 1, to facilitate exhaust flow of the high temperature gas, the fixed mold 1 has several air channels 12 connected to the mold cavity 4 near the central inlet 110 where Polycarbonate (PC) is injected. External air is taken in by an air pump through the air channels 12 into the mold cavity 4 to strip the substrate. High temperature gas in the mold cavity 4 thus passes through the gas passage 5 and exits via outlet 6 as the arrow indicates.

As mentioned above, high speed and high volume air from the channels 12 facilitates exhaust of high temperature gas from the mold cavity 4, however, the CD mold apparatus and transferring surface 211 can be contaminated and damaged by excess gas flow gas choking the gas passage 5.

SUMMARY OF THE INVENTION

Accordingly, an object of the present invention is to provide a CD molding apparatus with auxiliary gas channels. The CD molding apparatus comprises a movable mold, a fixed mold, a mold cavity, an outer ring, a gas passage, an outlet and an auxiliary gas channel. The movable mold is disposed adjacent to the fixed mold. The mold cavity is defined between the movable mold and the fixed mold. The outer ring surrounds the mold cavity, and the outlet is defined between the fixed mold and the outer ring. The gas passage is defined between the fixed mold and the outer ring and connects the mold cavity and the outlet. Particularly, the auxiliary gas channel is disposed in the fixed mold and connected to the gas passage to facilitate exhaust of high temperature gas from the mold cavity, wherein a material is injected into the mold cavity and the high temperature gas passes through the gas passage before exiting through the outlet.

DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE INVENTION

First Embodiment

Figure 1:
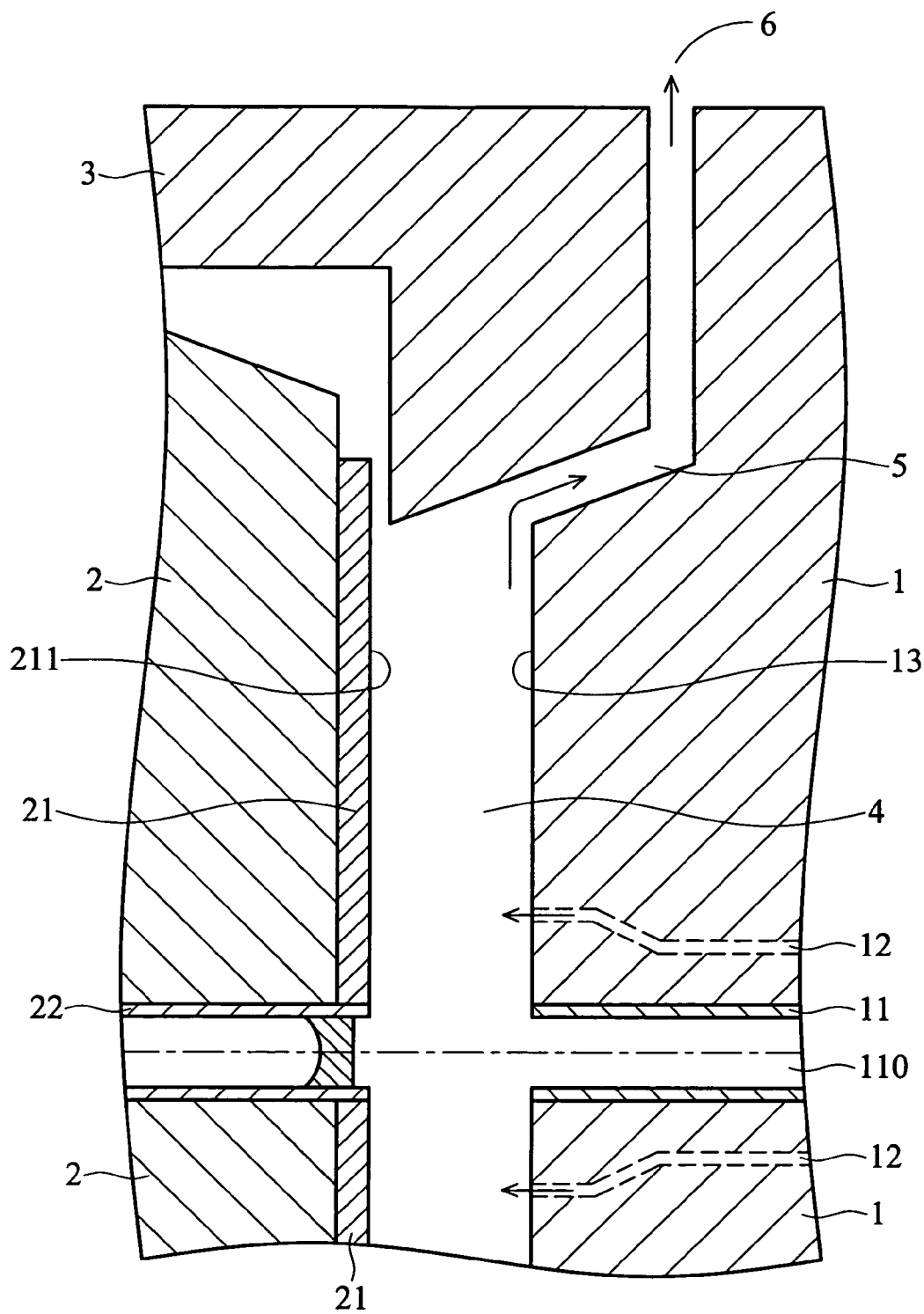
FIG. 1 is a sectional view of a conventional CD mold.

An object of the present invention is to facilitate exhaust of high temperature gas from the mold cavity 4. Referring to FIG. 1, the CD mold comprises a fixed mold 1, a movable mold 2 and an outer ring 3. A mold cavity 4 is defined between the fixed mold 1 and the movable mold 2. The outer ring 3 is disposed on the CD mold apparatus by surrounding the mold cavity 4. The fixed mold 1 has an injecting tube 11 such that Polycarbonate (PC) material flows into the mold cavity 4 through the injecting channel 110 to mold a CD substrate.

The movable mold 2 has a stamper 21 with pit patterns on the transfer surface 211 to imprint digital information to the CD substrate. Particularly, the movable mold 2 has a shaft 22 driven by a hydraulic cylinder (not shown) such that the mold 2 is movable perpendicular to the transfer surface 211. The movable mold 2 moves to the fixed mold 1 when injecting the Polycarbonate (PC) into the mold cavity 4, and the movable mold 2 leaves the fixed mold 1 when stripping the CD substrate. Furthermore, after the CD substrate is molded in the mold cavity 4, external air is taken in through the air channels 12 into the mold cavity 4 to strip the substrate from the fixed mold surface 13. Moreover, high temperature gas from the mold cavity 4 passes through the gas passage 5 between the fixed mold 1 and the outer ring 3 as the arrow indicates. As shown in FIG. 1, the gas passage 5 connects the mold cavity 4 and the outlet 6 such that high temperature gas in the mold cavity 4 can be rapidly exhausted.

Figure 2:
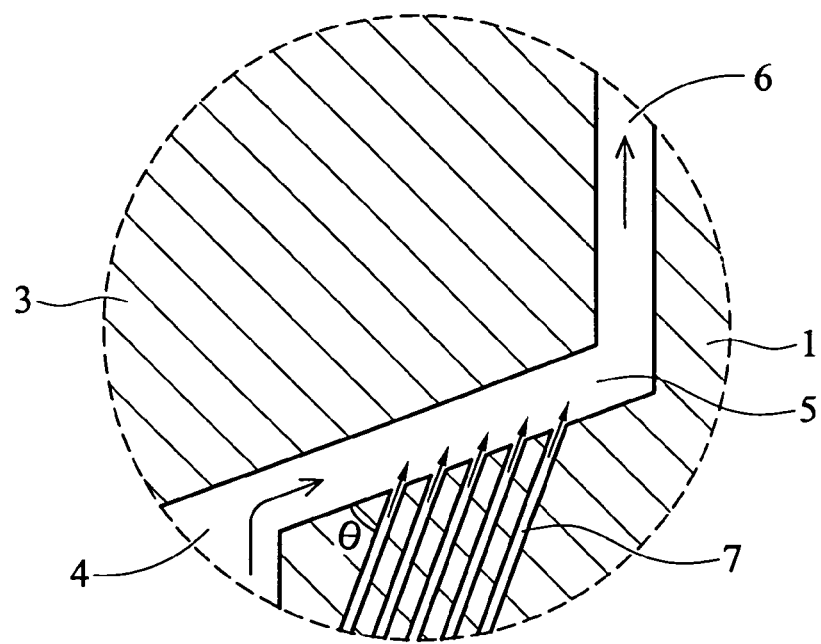
FIG. 2 is a sectional view of auxiliary gas channels connecting the gas passage in accordance with the first embodiment of the present invention.

As shown in FIG. 2, the fixed mold 1 has a plurality of auxiliary gas channels 7 parallel to each other. An air pump (not shown) is connected to the auxiliary gas channels. Particularly, the auxiliary gas channels 7 and the gas passage 5 have a first angle $\theta$ less than 90° toward the mold cavity 4 side. Furthermore, external high pressure air is taken into the gas passage 5 by the air pump through the auxiliary gas channels 7 to facilitate exhaust of high temperature gas as the arrows indicate, wherein the preferable first angle $\theta$ is between 10° to 30°. As mentioned above, injecting the external high pressure air from the air pump through the auxiliary gas channels 7 facilitates exhaust of high temperature gas and avoids gas passage 5 being choked.

Second Embodiment

Figure 3:
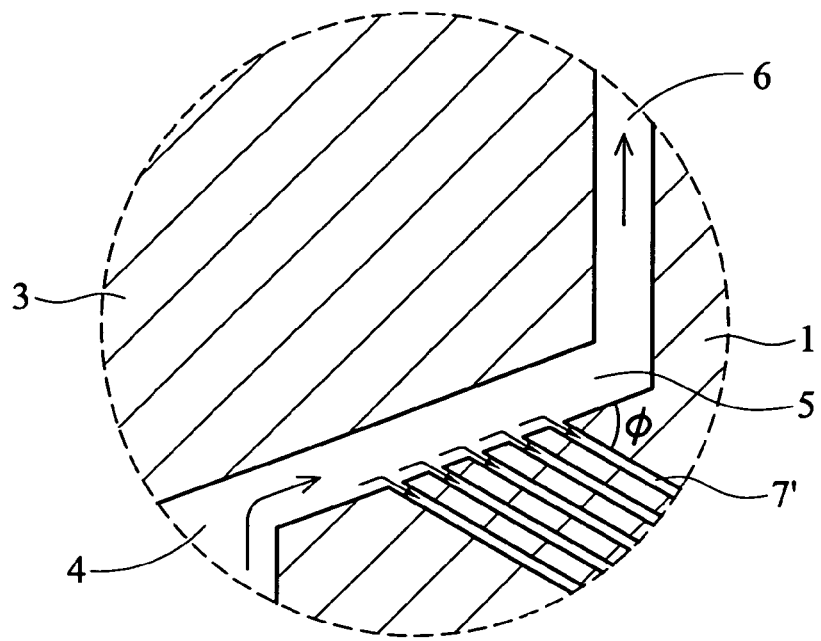
FIG. 3 is a sectional view of auxiliary gas channels connecting the gas passage in accordance with the second embodiment of the present invention.

Referring to FIG. 3, the fixed mold 1 has a plurality of auxiliary gas channels 7' parallel to each other. The auxiliary gas channels 7' connect an external vacuum pump (not shown) to exhaust the high temperature gas by suction (as the arrows indicate). As shown in FIG. 3, the gas in the mold can be alternatively exhausted through the outlet 6 or the auxiliary gas channels 7' such that the gas flow efficiency of the gas passage 5 increases without choking. Particularly, the auxiliary gas channels 7' and the gas passage 5 have a second angle Φ less than 90° toward the outlet 6 side. Thus, the high temperature gas in the gas passage 5 can be rapidly exhausted through the auxiliary gas channels 7' by suction, wherein the preferable second angle Φ is between 10° to 30°. As mentioned above, the auxiliary gas channels 7' can facilitate exhaust of high temperature gas and avoid the gas passage 5 choking.

The present invention provides a CD molding apparatus with auxiliary gas channels disposed in the fixed mold and connected to the gas passage. According to the above-mentioned embodiments, high temperature gas in the gas passage can be rapidly exhausted via the auxiliary gas channels by injecting external air or by suction. Furthermore, the gas flow efficiency of the gas passage also increases without choking.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A CD molding apparatus, comprising:
   a fixed mold;
   a movable mold disposed adjacent to the fixed mold;
   a mold cavity defined between the movable mold and the fixed mold;
   an outer ring surrounding the mold cavity;
   an outlet defined between the fixed mold and one side of the outer ring;
   a gas passage defined between the fixed mold and the outer ring, connecting the mold cavity and the outlet;
   an auxiliary gas channel disposed in a predetermined position of the fixed mold and connected to the gas passage to facilitate exhaust of high temperature gas from the mold cavity, wherein a material is injected into the mold cavity and the high temperature gas passes through the gas passage and exits the outlet.

2. The CD molding apparatus as claimed in claim 1, wherein the fixed mold has an injecting channel connecting the mold cavity to inject the material.

3. The CD molding apparatus as claimed in claim 1, wherein the fixed mold has an air channel connecting the mold cavity.

4. The CD molding apparatus as claimed in claim 1, wherein the auxiliary gas channel and the gas passage have an first angle less than 90° toward the mold cavity side.

5. The CD molding apparatus as claimed in claim 4, wherein an external air is injected into the gas passage through the auxiliary gas channel.

6. The CD molding apparatus as claimed in claim 4, wherein the first angle is between 10° and 30°.

7. The CD molding apparatus as claimed in claim 1, wherein the auxiliary gas channel and the gas passage have a second angle less than 90° toward the outlet side.

8. The CD molding apparatus as claimed in claim 7, wherein the high temperature gas in the gas passage is exhausted through the auxiliary gas channel.

9. The CD molding apparatus as claimed in claim 7, wherein the second angle is between 10° and 30°.

\* \* \* \* \*